Aug. 24, 1937.  B. A. STEWART  2,091,125
APPARATUS FOR MAKING EXTRUDED PRODUCTS
Original Filed Aug. 9, 1929  2 Sheets-Sheet 2
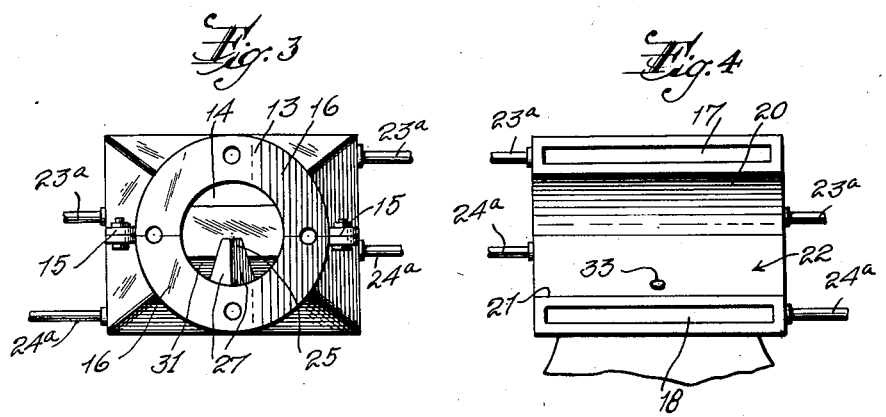
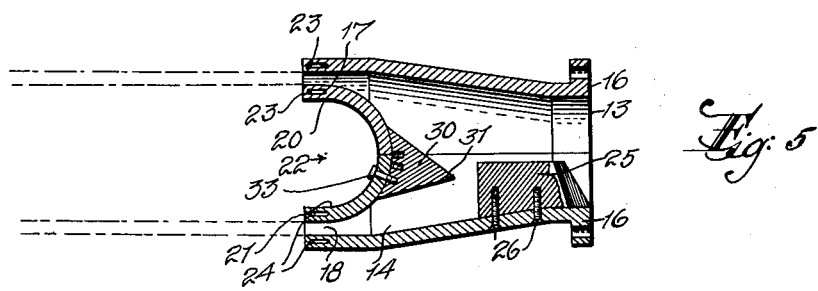
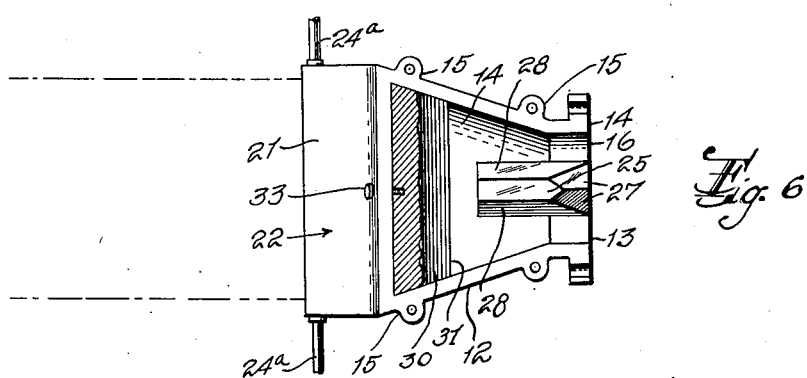
INVENTOR
Burns A Stewart
BY
Samuel Stearman
ATTORNEY Patented Aug. 24, 1937

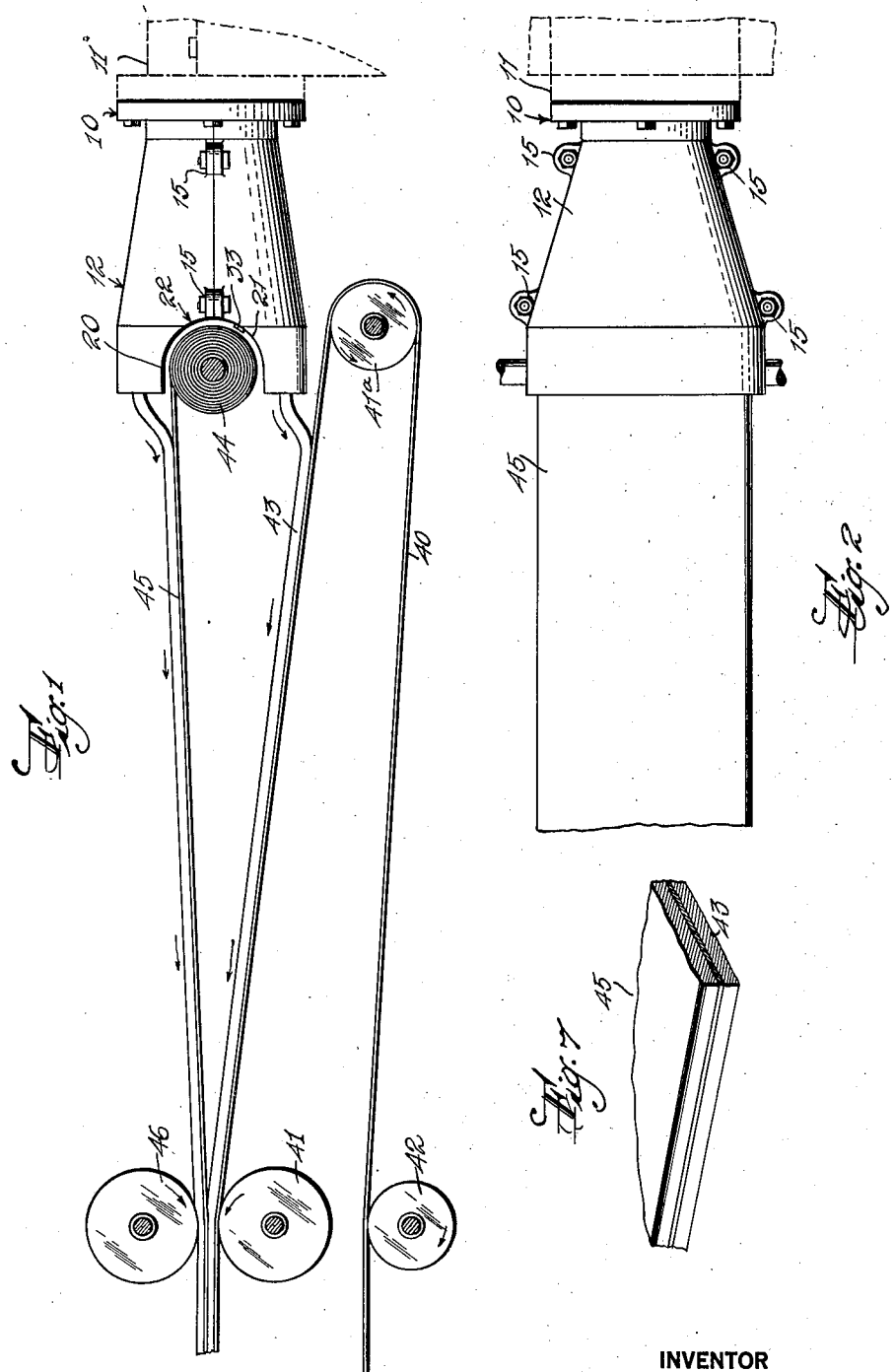

2,091,125

UNITED STATES PATENT OFFICE 2,091,125

APPARATUS FOR MAKING EXTRUDED PRODUCTS

Burns A. Stewart, Nutley, N. J., assignor to The Patent and Licensing Corporation, Boston, Mass., a corporation of Massachusetts Original application August 9, 1929, Serial No. 384,735. Divided and this application November 28, 1930, Serial No. 498,520

9 Claims. (Cl. 25—17)

This application is a division of my co-pending application, Serial Number 384,735, filed August 9, 1929.

This invention relates to improvements in mechanism for the manufacture of extruded products and more particularly to mechanism for extruding plastic waterproofing compositions, such for example as mixtures of bituminous material combined with fibres and other fillers.

The invention is particularly concerned with the production of boardlike structures composed of a central ply or membrane of sheet fibrous material, and adherent outer layers of mastic material composed of mixtures of bitumen, fibre, and fillers.

The primary object of the invention is to provide a mechanism for bringing together in proper relationship, the mastic material in the form of extruded sheets of predetermined thickness and cross-section, with the fibrous sheet forming the central ply or membrane.

Another object of the invention resides in the construction of an extruding head for extruding plastic mixtures of bitumen, fibers and fillers whereby to form simultaneously spaced separate sheets of mastic material, between which the fibrous sheet composing the central ply may be continuously supplied.

Still another object of the invention is the provision of means for adjusting the quantity of plastic material forced through the separate portions of the extruding head for the formation of the two separate mastic sheets.

In the drawings,

Figure 1 is a side elevation of apparatus embodying my invention.

Figure 2 is a plan view of part of the mechanism shown in Figure 1.

Figure 3 is a view in elevation of the rear end of the extruding head, constructed according to my invention.

Figure 4 is a similar view of the forward end thereof.

Figure 5 is a longitudinal cross-section through the extruding head.

Figure 6 is a view partially in plan and partially in horizontal cross-section through the extruding head, and Figure 7 is a fragmentary view of the product as produced by the apparatus shown in Figures 1 to 6.

The invention is particularly concerned, as heretofore stated, with the formation of extruded sheets composed of suitable mixtures of bituminous material, fibre and fillers, and for this purpose the bituminous material consists preferably of asphalt of 140 to 280° F. melting point and this asphalt is combined with rag, news or other fibres and fillers such as clay, slate dust, cork, and other finely divided or comminuted material, all in such proportions as to produce a mass of desired hardness and consistency. It will be understood of course that the composition of the mix to be extruded will be governed by the particular use to which the product is to be applied.

The product as produced by my present invention is suitable for use as expansion joint material between concrete slabs and other uses thereof in the building arts will be readily appreciated by those skilled in these fields.

For such uses as expansion joints and the like, the plastic mass which is to be extruded in accordance with my invention may consist of disintegrated and plasticized scrap asphalt prepared roofing of which considerable quantities are available in the roofing industry. This roofing scrap may be formed into a homogeneous plastic mass in any conventional form of kneading or masticating machine, compounded if desired with additional quantities of asphalt to impart the desired consistency thereto.

The plastic mass to be extruded in the manner hereinafter to be more fully described, may be supplied from any convenient source to the extruding device constructed in accordance with the invention. This extruding device is indicated as a whole in the drawings by the numeral 10, and consists of a feed chamber 11, provided with a screw conveyor to force the plastic material under pressure into and through the extruding head proper, indicated at 12.

The extruding head 12 is formed in accordance with my invention in two halves, consisting of an upper hollow semi-frustro-conical section 13 and a similar hollow semi-frustro-conical section 14. These separate sections may be secured to each other through bolted flanges 15 and to the forward end of the feed chamber 11 as by means of bolts passing through openings in a flange plate 16 formed at the rear end of each section.

The forward ends of the sections 13, 14 merge into horizontally elongated mouths or openings 17, 18 respectively, extending crosswise of the sections between the outer walls thereof and arcuate walls 20, 21. These openings 17, 18 may themselves serve as the extruding dies, but generally they are fitted with separate dies of desired size and cross-section. In this way, two spaced extruding nozzles 17 and 18 are provided, between which there is a semi-cylindrical recess 22 for a purpose as will presently appear. The walls of the nozzles 17 and 18 adjacent the mouth thereof, are preferably hollowed out as shown at 23, and 24, to provide jackets through which a temperature regulating medium such as steam or hot water may be circulated as by means of pipe connections 23a, 24a respectively whereby the proper temperature conducive to smooth extrusion is afforded.

In order to cause the plastic material formed into and through the extruding head 12 from the feed chamber 11 to be spread and distributed laterally through the extruding head, a spreading device 25 may be secured to the lower section 14 as by means of screws 26 passing therethrough and into threaded openings formed in the spreading device 25. The spreader 25 is provided with inclined faces 27 and 28 designed to cause the plastic material to be spread laterally in its passage through the extruding head. Provision is also made for adjusting the flow of the plastic material through the nozzles 17 and 18. Manifestly the plastic material passing through the frustro-conical portion of the extruding head will normally tend to flow through the lower discharge nozzle 18, but in order to cause a sufficient quantity thereof continually to pass upwardly and be forced through the upper nozzle 17, I provide a triangular choke device 30, formed with a surface opposite the apex 31, concentric with the arcuate walls 20, 21 of the separate sections 13, 14. This arcuate face of the choke device 30 is provided with a series of threaded openings adapted to receive a bolt 33 passing through an opening in one of the walls 20, 21, whereby the choke device may be secured in any one of several positions around the inner face of the walls 20, 21. According to the position of the choke device 30 around the inner face of the walls 20, 21, the plastic material passing through the extruding head may be caused to take either a downward or an upward course, but preferably, the choked device is adjusted to permit passage of the plastic material to both the upper and lower discharge nozzles 17, 18 in regulated quantities to insure continuous extrusion of two sheets of the plastic material.

The extruding device with the extruding head constructed as heretofore described, will be mounted, in operation, adjacent one end of an endless conveyor belt 40 passing around pulleys 41, 41a, and guide rolls 42, so that the sheet of plastic material 43 extruded through the lower discharge nozzle 18 will be received by and carried forwardly upon the conveyor belt 40, the latter being supplied if desired with a soap solution or other nonadhesive material to prevent sticking of the plastic sheet thereto. In the recess 22 formed between the upper and lower discharge nozzles 17 and 18 there is mounted a supply roll 44 of fibrous sheet material composed preferably of asphalt saturated or asphalt saturated and coated roofing felt. The fibrous sheet is drawn continuously from the roll 44 to travel preferably in a downwardly inclined direction in position to receive upon its upper face the sheet of plastic material 45 extruded from the upper discharge nozzle 17. The fibrous sheet carrying the extruded sheet 45 joins with the extruded sheet 43 at the nip between the pulley 41 and a cooperating pulley 46 which press the whole together and assist in drawing the same forwardly. The sheet as thus finished is illustrated fragmentarily and in Figure 7, may then pass through suitable cutting mechanism for separating the same into sections or units of desired size and shape.

I claim as my invention:

1. Apparatus for extruding plastic material of predetermined cross-section, comprising a chamber having a plurality of discharge openings of substantially greater length than width and means for distributing the plastic material in said chamber in the direction of the length of said openings.

2. Apparatus for extruding plastic material, comprising a chamber having a discharge opening of substantially greater length than width and means for distributing the plastic material in the direction of the length of said openings.

3. Apparatus for extruding plastic material, comprising a chamber having a plurality of spaced discharge openings and means for spreading the plastic material in advance of its approach to said discharge openings in a direction substantially perpendicular to the direction in which said openings are spaced.

4. Apparatus for extruding plastic material, comprising a chamber having a plurality of vertically spaced discharge openings and means for spreading the plastic material laterally as it is fed through the chamber.

5. Apparatus for extruding plastic material, comprising a chamber having a plurality of spaced discharge openings therein, means for distributing the plastic material laterally of said chamber and means for controlling the relative amount of plastic material fed to each of said openings.

6. Apparatus for extruding plastic material, comprising a chamber having a plurality of vertically spaced discharge openings therein, means secured to one of the inner faces of said chamber for distributing the plastic material laterally of said chamber and means for controlling the amount of plastic material going to each of said openings.

7. Apparatus for extruding plastic material, comprising a chamber having upper and lower discharge openings, means for feeding the plastic material along a path normally approaching one of said openings, means in said chamber for causing the plastic material fed therethrough to follow a path approaching the other of said openings and another means for spreading the plastic material laterally during its passage through said chamber.

8. An apparatus for extruding plastic material, comprising a chamber having a plurality of openings therein, and a substantially U shaped wall between said openings forming a cavity adapted to receive a roll.

9. An apparatus for fabricating composition strips comprising an extrusion device including a head having a bore terminating in a plurality of outlets through which layers of plastic material are adapted to be fed, and a chamber adjacent the outlets for containing a foundation roll which is to be conjoined with the plastic layers.

BURNS A. STEWART.